United States Patent Office 3,489,220
Patented Jan. 13, 1970

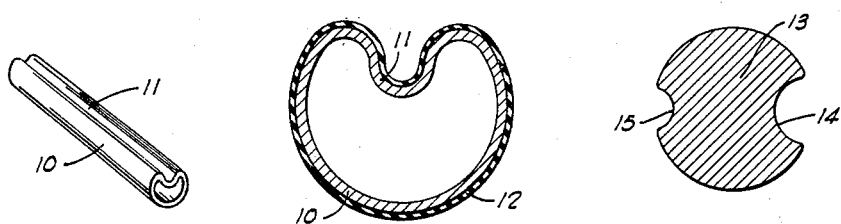
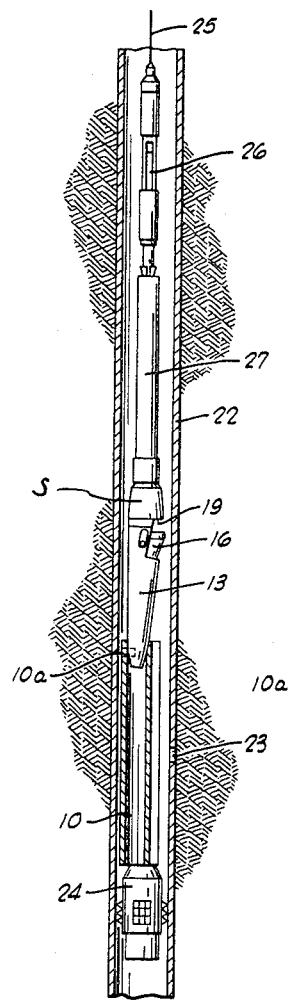
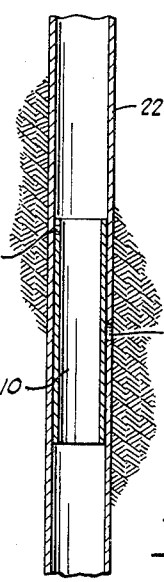
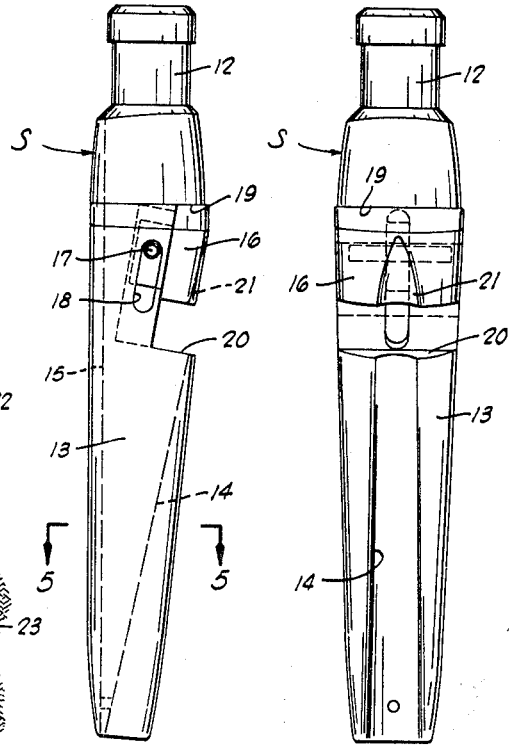
Fig.1  Fig.2  Fig.5
Fig.3  Fig.4
Fig.6  Fig.7
INVENTOR.
MYRON M. KINLEY
BY
Hayden Pravel Wilson & Matthews
ATTORNEYS

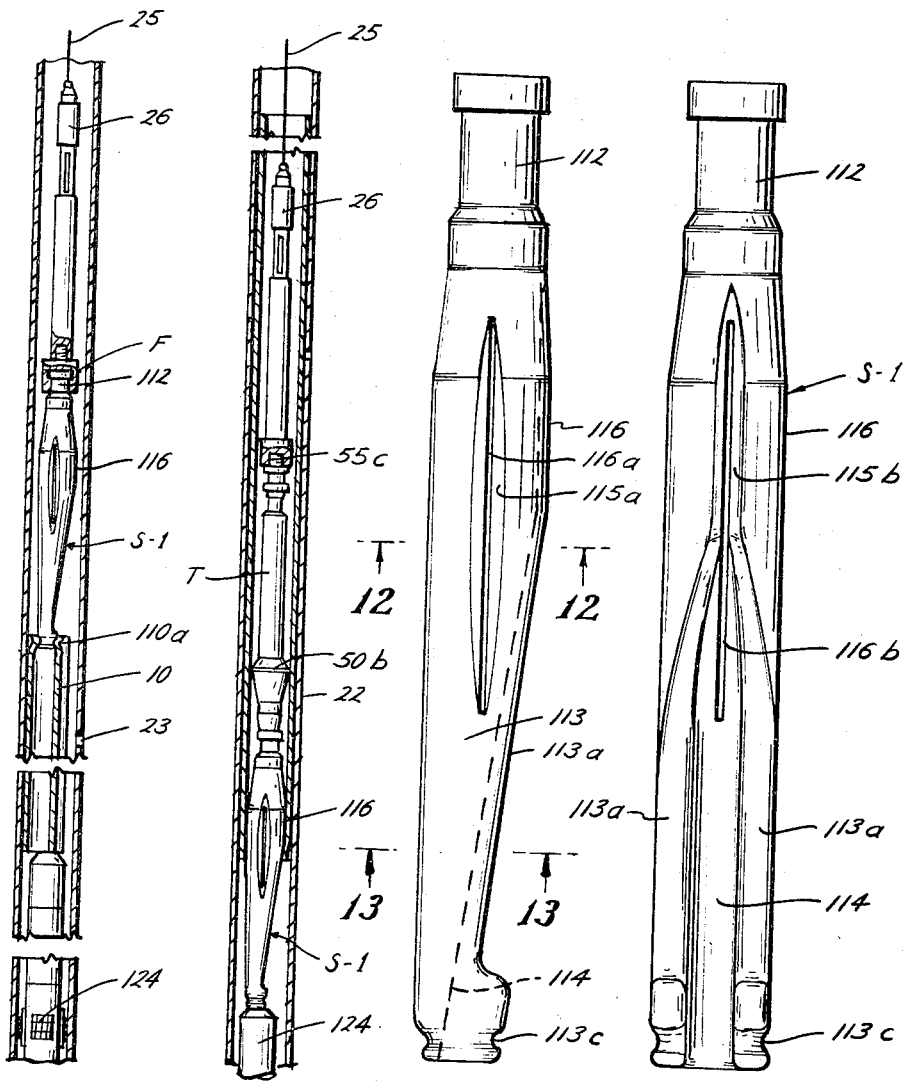

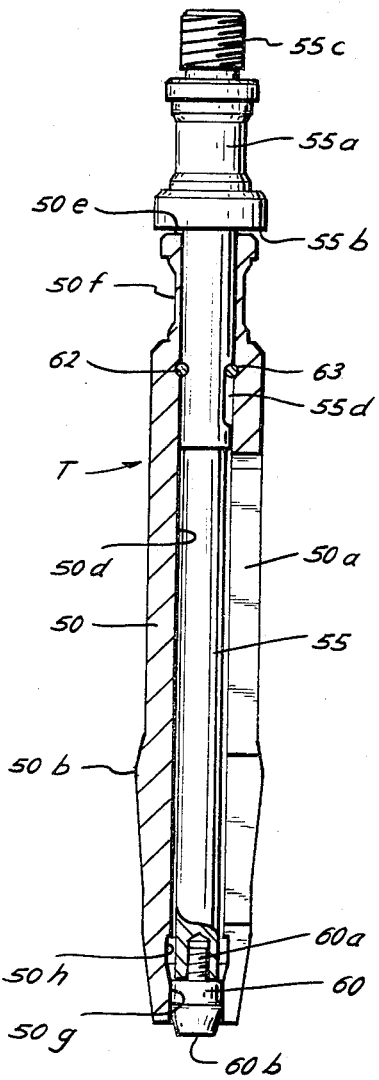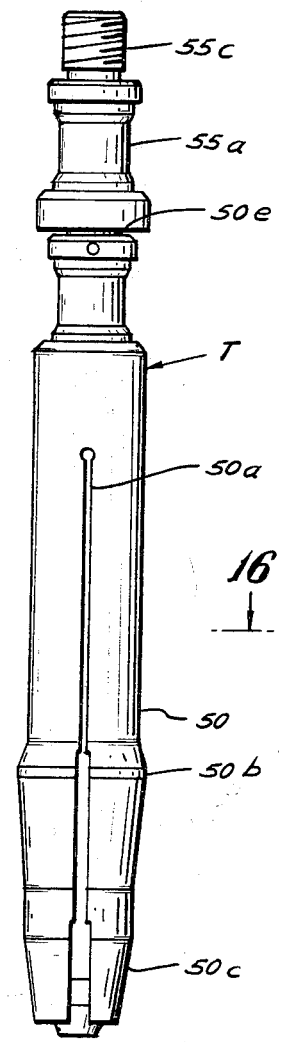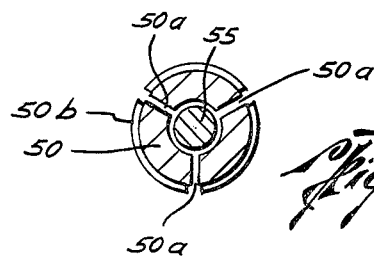

3,489,220
METHOD AND APPARATUS FOR REPAIRING
PIPE IN WELLS
Myron M. Kinley, Chickasha, Okla., assignor to J. C. Kinley, doing business as J. C. Kinley Co., Houston, Tex.
Continuation-in-part of application Ser. No. 552,812, May 25, 1966. This application Aug. 2, 1968, Ser. No. 749,771
Int. Cl. E21b 29/00, 43/10
U.S. Cl. 166—277                                    15 Claims

ABSTRACT OF THE DISCLOSURE

A method and apparatus for repairing pipe, such as casing or tubing in oil wells or the like, wherein there is a hole in the pipe existing there from wear or corrosion or previously put there on purpose, as by shooting an explosive.

CROSS-REFERENCE TO RELATED APPLICATION

This application is a continuation-in-part of my copending application Ser. No. 552,812, filed May 25, 1966, now forfeited.

BACKGROUND OF THE INVENTION

The field of this invention is method and apparatus for repairing pipe in wells.

In accordance with the invention, a hollow malleable cylindrical metal liner of an outer diameter about the same as the inside diameter of the pipe to be repaired is deformed to put a groove therein and thus reduce its diameter. This deformed liner is then lowered on a special tool into the pipe and the liner is seated on a stop so that it covers the hole in the pipe. The tool is then driven down into the deformed liner to expand it out to its original cylindrical shape. The special tool is so constructed that it can then be pulled back up through the liner.

It is old in the U.S. patent to English, No. 2,214,226 to repair a hole in casing in a well by expanding a liner in the casing. It is old in the U.S. patent to Leonard No. 1,233,888 to lower a corrugated casing into an open hole and expand it until it engages the earth formations. Corrugated liners are employed to repair casing in the U.S. patents to Lang, No. 3,167,122, and Vincent, No. 3,179,168.

SUMMARY OF THE INVENTION

The present invention is directed to the installation in a pipe of a liner having at least one reverse bend by jarring an expanding tool on a wireline to form a substantially smooth cylinder in the pipe to be repaired or lined therewith.

As to the use of liners for repairing tubing, see the U.S. patent to Kinley, No. 3,197,677 and the prior art cited therein. The expansion of the liner to an enlarged diameter after substantially removing the reverse bend or bends may be accomplished with an enlarging tool such as disclosed in said Patent No. 3,197,677, or by a special enlarging tool as disclosed herein.

BRIEF DESCRIPTION OF THE DRAWING

In the accompanying drawing,
FIG. 1 is a view in perspective of a malleable metal liner constructed in accordance with the preferred embodiment of the present invention;
FIG. 2 is an enlarged cross-sectional view of the liner of FIG. 1, and showing, exaggerated, a coating of rubber on the outside of the liner;
FIG. 3 is a view in side elevation of one type of swaging tool adapted to be driven through the liner of FIG. 1 to expand it into cylindrical shape;
FIG. 4 is a front view of the tool of FIG. 3;
FIG. 5 is a cross-sectional view of the tool of FIG. 3, taken on the line 5—5 thereof;
FIG. 6 is a somewhat diagrammatic cross-sectional view of casing in an oil well, with a liner and swaging tool constructed in accordance with the invention lowered into place therein, but before the liner is expanded;
FIG. 7 is a diagrammatic cross-sectional view of the casing of FIG. 6 with the liner expanded and the tools removed;
FIG. 8 is a vertical sectional view, partly in elevation, of a modified form of the invention, illustrating the positioning of a liner in a pipe;
FIG. 9 is a view similar to FIG. 8 but illustrating a subsequent step in the method of installing the liner in the pipe, using a special enlarging tool;
FIG. 10 is a side view of a modified swaging or expander tool for removing the reverse bend or bends in the liner;
FIG. 11 is a front view of the tool shown in FIG. 10;
FIG. 12 is a cross-sectional view taken on line 12—12 of FIG. 10;
FIG. 13 is a cross-sectional view taken on line 13—13 of FIG. 10;
FIG. 14 is a vertical sectional view, partly in elevation, of a special enlarging tool for enlarging the liner to its final diameter in a pipe;
FIG. 15 is an elevation of the enlarging tool of FIG. 14; and
FIG. 16 is a cross-sectional view taken on line 16—16 of FIG. 15.

DESCRIPTION OF THE PREFERRED EMBODIMENTS

Referring to the drawing in detail, the liner 10 of FIGS. 1 and 2 is shown as consisting of a hollow cylinder or tube of malleable material provided with a single reverse bend deformation or groove 11. This groove 11 may be formed in a cylindrical metal tube as by passing it through a die. In making it, the original overall diameter of the tube is reduced so that its outside diameter is less than the inside diameter of pipe in which it is to be placed in accordance with the invention. Preferably, as will be explained more in detail, the original diameter of the tube is slightly less than the inside diameter of the pipe in which it is to be secured so that an initial removal of the reverse bend is followed by an enlargement of the tube to cause it to fit tightly in the pipe.

The deformed liner of FIGS. 1 and 2 may be provided with a coating 12 (FIG. 2) of elastomer or other deformable sealing material such as lead, zinc or plastic. The coating may be secured to the metal by "rubber-welding," plating, bonding or by other known methods.

FIGS. 3, 4 and 5 show one type of swaging or expander tool S which may be forced through the liner 10, when it is in place in a well, to iron out the groove 11 and bring the liner back substantially into its original cylindrical shape so as to be practically the same outside diameter as, or slightly less than, the inside diameter of the pipe being repaired.

The swaging tool S may include a head 12 adapted to be connected to means for lowering it into a well, and for driving it down through the liner, as shown in FIGS. 6 and 7, and described hereinafter. Depending from the head 12, there is a solid wedge portion 13, which is generally cylindrical in shape on the left-hand side, as viewed in FIG. 3 but shaped to have a reverse bend slotted taper 14 as shown in a dotted line on the right-hand side, as viewed in FIG. 3. This taper 14 conforms to and may be fitted into the top of the liner 10 and force the groove 11 out to cylindrical shape as it is driven downwardly through the liner 10.

A fluid course 15 may extend vertically along the wedge portion 13, as shown in dotted lines in FIG. 3, to prevent fluid from being trapped below the tool S when jarring it downwardly in the liner 10, to thereby prevent a fluid lock or impediment to downward movement of the tool S in the liner 10.

At the upper part of the wedge portion 13, there is a vertically movable segment 16, held in place by a guide pin 17 in slots 18. The segment 16, as it moves upwardly, strikes a shoulder 19 on the wedge portion 13, and as it moves downwardly, strikes a shoulder 20 on the wedge portion 13.

The segment 16 has a reverse-bend slotted taper 21 along its side, which is a continuation of the slotted taper 14 of the wedge portion 13. The overall cylindrical diameter of the top of the segment 16 and the portion 13 is that of the inside diameter of the liner 10 when the liner is swaged out to its cylindrical shape.

FIG. 6 shows the deformed liner 10 and the swaging tool S in casing 22 in a well. The liner 10 is attached to the tool S by shear pin 10a or any other releasable attaching means. The casing has a hole 23 or other defect therein which is to be patched or covered by the liner 10. A removable stop 24 of any suitable construction, but preferably of the collapsible type disclosed in my copending application Ser. No. 668,748, filed Sept. 14, 1967, has been placed in the casing below the hole 23 and the liner 10 is resting upon it.

The swaging tool S may be suspended from a wire line or cable 25 through link jars 26 or any other suitable wire line jars. In addition there may be an explosive jar in the string, between the jar 26 and the swaging tool, is indicated generally at 27 in FIG. 6. This may be like that disclosed in my U.S. Patent No. 3,199,594. See also my U.S. Patent No. 3,191,677. However, the present invention is not to be regarded as limited to the use of explosives. Ordinary standard wire line tools may be used to drive the swaging tool S down through the liner 10.

After the liner 10 is brought out to substantially or fully cylindrical form, as shown in FIG. 7, the swaging tool may be withdrawn by the cable. Because the segment 26 will drop down against the shoulder 20 as the tool is lifted, it will readily pass upwardly through the liner.

It is not the intention that the swaging tool S necessarily expand the liner 10 into tight sealing engagement with the casing. This may or may not be so. It is contemplated that after the liner 10 has been brought out to its original cylindrical shape, or approximately such shape, over at least a portion of its length, that it may be further expanded, as by means like that disclosed in my U.S. Patent No. 3,191,677, or by other suitable means, as described hereinafter in FIGS. 14–16 in particular. It is also possible in some instances to expand the diameter of the liner 10 to a greater size than its original diameter, using just the swaging or expander tool S, or using the swaging tool S or its equivalent, together with or followed by an enlarging tool such as shown in FIGS. 14–16, as will be more fully explained.

In FIGS. 10–13, the details of a modified swaging or expander tool S–1 are illustrated. The tool S–1 is made of a single piece of steel or is made into a unitary body of steel, which is preferably solid except for the slots and grooves as will be explained. The movable segment 16 and its attendant parts such as provided for the tool S are not included in the tool S–1. The tool S–1 has a solid steel body 113 which is tapered downwardly and inwardly as indicated at 113a on one side of the body 113, while the other side 113b is generally cylindrical although slightly tapered inwardly and downwardly from the maximum diameter or cylindrical portion 116 near the upper end of the tool S–1. The body 113 has a reverse bend slotted taper 114, the angle of which is illustrated by a dotted line in FIG. 10. Such taper 114 conforms to the reverse bend 11 of the liner 10 at its lower end so that the lower end of the body 113 may be positioned in the upper end of the liner 10 for initially positioning the liner 10 in position in the pipe 22 (FIG. 8), and for subsequently forcing the reverse bend 11 out to its original cylindrical shape, or substantially to such shape as the swaging tool S–1 is driven downwardly within the liner 10.

For the purposes of holding the liner 10 on the lower end of the tool S–1 for the initial positioning of the liner 10 in the pipe 22, so as to be subsequently releasable therefrom, the body 113 has a groove 113c at its lower end so that the pipe 10 can be dimpled as indicated at 110a (FIG. 8) at several points around its circumference into such groove 113c to thereby releasably retain the liner 10 in position at the lower end of the stool S–1. Such crimping or dimpling of the pipe 10 at 110a is utilized in place of the shear pin 10a of FIG. 6, and it will be appreciated that such releasable retaining means are interchangeable and other suitable retaining means which is releasable upon a jarring of the tool S or S–1 relative to the liner 10 could be utilized.

The upper portion 116 of the tool S–1 is normally of sufficient diameter to straighten out the reverse-bend 11 in the liner 10 so that the liner 10 assumes its substantially cylindrical shape. However, the diameter of the upper cylindrical portion 116 of the tool S–1 may be slightly larger than the internal original bore diameter of the liner 10 for stretching or enlarging the liner 10 as the tool S–1 passes downwardly therethrough. However, there is a danger of getting the jarring tool S–1 stuck in the liner 10 if it is attempted to stretch the liner 10 to an increased diameter as compared to its original diameter, particularly if the operation is a single operation in which the liner 10 becomes tightly wedged in the pipe 22 using only the tool S–1. Therefore, and as will be explained more in detail hereinafter, it is normally preferable to use the tool S–1 for an initial expansion or straightening of the reverse-bend 11 of the liner 10, followed by a subsequent stretching or enlargement of the liner 10 from its original diameter, using a tool such as described hereinafter in connection with FIGS. 14–16, or other appropriate means.

To permit some contraction of the cylindrical portion 116 of the tool S–1, the body 113 is formed with a plurality of slots 116a and 116b. To provide for the passage of fluid around the tool S–1 as it is lowered downwardly into the liner 10, so as to prevent a fluid lock or other impediment to the downward travel of the tool S–1 in the liner 10, fluid courses 115a and 115b are provided in proximity to the slots 116a and 116b. Such fluid courses or channels 115a and 115b are used in place of the fluid channel 15 of the tool S, but they are interchangeable and either could be used.

The upper end of the S–1 tool has a fishing neck 112 which is adapted to be engaged by any suitable releasable fishing tool such as indicated by the letter F in FIG. 8.

An enlarging tool T for use in conjunction with the tool S–1 or any other suitable jarring or swaging tool is shown in detail in FIGS. 14–16. The tool T includes a resilient steel body 50 which is slotted at two or more longitudinal slots 50a so as to provide a plurality of resilient fingers as a part of the body 50. The lower portion of the body 50 is enlarged to its maximum diameter as indicated at 50b and it tapers downwardly therefrom to the reduced tapered portion 50c at the lower end of the body 50. Such construction facilitates the entry of the body 50 into the liner 10 and causes a gradual expansion or stretching of the liner 10 to an enlarged diameter as compared to its original diameter until it reaches the maximum diameter when the enlarged diameter portion 50b passes through the liner 10.

To expand the fingers of the body 50 outwardly to provide the desired diameter at 50b, the body 50 has a hollow bore or longitudinal passage 50d therethrough, into which a movable control rod 55 extends. The rod 55 has a fishing neck 55a at its upper end which has annular shoulder 55b which is adapted to engage an upper shoulder 50e on a fishing neck 50f formed at the upper end of the body 50. A male threaded connection 55c may be formed at the upper extremity of the rod 55 for connection with the lower end of a sucker rod or the lower end of the wire line jar 26, such connection being indicated in FIG. 9. However, such threaded connection 55c may be omitted or covered by a blind box, in which case the tool T is either dropped in the pipe 22 or is lowered on a tool engageable with the fishing neck 55a.

The lower end of the rod 55 has an expander head 60 removably secured thereto, preferably by a threaded pin connection 60a. Since head 60 has a larger diameter than the normal diameter of the inner bore 50d at the lower end of the body 50 so that such head 60 holds the fingers of the body 50 in an extended position with a space in each slot 50a which is greater than initially cut therein. Heads 60 having different diameters may be used so that the tool T may be used in liners 10 having different diameters. During the running in of the tool T, the lower end 60b of the head 60 extends below the lower end of the body 50 as illustrated in FIG. 14 and it is held in such position by a shear pin 62 which extends through the body 50 and through a notch or opening in the rod 55 (FIG. 14). When the lower end 60b of the head 60 is engaged or hit upon the upper end of the swaging tool S-1 as will be explained more in detail hereinafter, the head 60 is caused to move upwardly so that its lower end 60b is flush with the lower end of the body 50 to thus shear the pin 62. A second pin 63 is also preferably provided which extends through the body 50 and into a longitudinal slot 55d in the rod 55, to prevent rotation of the rod 55 relative to the body 50 for thereby avoiding an inadvertent unthreading of the head 60, while permitting longitudinal movement of the rod 55 relative to the body 50 for retracting the fingers of the body 50, as will be explained.

The inner bore of the body 50 is of substantially the same diameter throughout its length, including its lower end 50g, but it is enlarged at a chamber 50h for receiving the head 60 when the rod 55 is moved upwardly a sufficient distance relative to the body 50. Thus, the chamber 50h conforms generally to the external shape and size of the head 60 so that the fingers formed in the body 50 by reason of the slots 50a are permitted to return to their normal or original diameter to thus cause a retraction and a reduction in the diameter of the enlarged portion 50b to facilitate withdrawal of the tool T from the liner 10 after it has been securely stretched into tight contact with the inside of the pipe or tubing 22.

In carrying out the method of this invention, utilizing the swaging or expander tool S-1 and the enlarging or stretching tool T, the liner 10 is initially positioned on the lower end of the tool S-1 by crimping same as indicated at 110a, or by the use of any other suitable releasable connection, as previously explained. The jarring tool S-1 is lowered on a wire line 25 which preferably has a wire line jar 26 therewith as illustrated in FIG. 8. The fishing tool connection F is a typical conventional releasable connection which is adapted to be released from the fishing neck 112 in the conventional manner when it is desired to leave the tool S-1 in the well or pipe 22 and remove the jars 26 and the other apparatus that may be secured to the wire line 25 above the tool S-1.

The liner 10 is lowered into the pipe 22 until it reaches a suitable support 124 which is preferably a collapsible support of the type disclosed in my copending application Ser. No. 668,748, identified above. Such support 124 is indicated only schematically in FIGS. 8 and 9 since the details thereof form no part of the present invention, except to the extent that the steps of the present method may be carried out utilizing such collapsible support.

In any event, after the liner 10 has been positioned on the collapsible support 124 as illustrated in FIG. 8, the wire line 25 is manipulated by the operator at the surface to jar the jars 26 to thus initially cause the tool S-1 to become released from the crimped portion 110a and to initially straighten same as the tool S-1 moves downwardly within the liner 10. By reason of the coaction between the groove 114 of the tool S-1 and the reverse bend 11, the liner 10 is expanded outwardly to either its full cylindrical shape, or substantially the full cylindrical shape by the time the cylindrical portion 116 of the tool S-1 reaches each portion of the liner 10.

In the preferred form of the method of this invention, the liner 10 is approximately ten feet in length, although the particular length is not critical so long as the length is sufficient to extend above and below the hole 23 or other defect in the pipe 22 to be repaired. The tool S-1 is preferably driven down by the manipulation of the wire line so as to expand approximately one-half of the length of the liner 10 to its original diameter, or approximately the original diameter. At that point, the tool S-1 is approximately half way down in the liner 10, or at some intermediate position in the liner 10, and the fishing tool F is released from the fishing neck 112 by manipulation of the wire line from the surface, as is well understood. The jars 26 and all of the parts connected therewith above the tool S-1 are then removed from the pipe 22 by raising the wire line 25. Then the lower end of the jar 26 or other suitable jarring device is connected to the upper end of the enlargement tool T, and it is lowered on the wire line 25. Alternatively, the tool T may be dropped in the pipe 22 without supporting it on a wireline. The lower end 60b of the tool T extends outwardly below the body 50, as previously explained, so that it initially contacts the upper end of the expander tool S-1 to shear the pin 62, as explained. Thereafter, by manipulating the wire line 25, the jarring force from the jars 26 are transmitted through the tool T to the tool S-1 so as to force both the tool S-1 and the tool T downwardly together, with the tool S-1 preceding the tool T.

Such jarring may be from blows transmitted from the jar 26 to the upper end or the fishing neck 55a when the connection 55c is omitted, or to a blind box (not shown) covering the threaded connection 55c.

In the normal situation, the tool S-1 removes the reverse bend so as to provide a substantially cylindrical tube, and the enlarged portion 50b of the tool T enlarges the liner 10 to an increased diameter as compared to its original diameter so as to securely wedge the liner 10 in the pipe 22.

When the expander tool S-1 reaches the lower end of the liner 10, it contacts the collapsible support 124, which collapses and permits the tool S-1 to continue on through the bottom of the liner 10 until the liner 10 is fully returned to its substantially cylindrical position throughout its full length.

The jarring of the tool T downwardly to continue to drive the tool S-1 through the bottom of the liner 10 is continued until the tool T has passed downwardly sufficiently for its enlarged diameter 50b to pass through the lower end of the liner 10. At that time, the wire line 25 is pulled upwardly which initially causes a movement of the head 60 into the recess 50h (FIG. 14) so that the diameter of the enlarged portion 50b is reduced and is thus slightly smaller than the internal diameter of the liner 10 to facilitate the removal of the tool T through the liner 10. Thereafter, a conventional fishing tool is lowered to engage the fishing neck 112 so as to effect a removal of the expander or swaging tool S-1 through the liner 10 and then to the surface. The collapsible support 124 is then also removed, leaving only the liner 10 in position. It will be appreciated that the deformable sealing coating 12 on the external surface of the liner 10 provides a fluid-tight seal on each side of the defect or hole 23 in the pipe 22 so that the liner 10 thus provides for a complete repair of the defective area of the pipe 22.

In some instances it may be desirable to lower the tool T on the wire line 25, or drop same for subsequent passage of the tool T throughout the length of the liner 10 for enlarging the same still further after the initial enlargement with the tool T. In such instances, the head 60 may be changed for one with a slightly larger diameter so as to increase the diameter of the enlarged portion 50b of the tool T for each subsequent run. The tool T is jarred downwardly by the jars 26 on a wireline 25 for forcing the tool T downwardly through the liner 10.

It should be understood that although the preferred method is described above, it is possible to drive the tool S–1 completely through the liner 10 with the arrangement illustrated in FIG. 8 and then to withdraw the tool S–1 prior to lowering the tool T for the final expansion. However, if such procedure is followed, the collapsible support 124 must not be disturbed until the liner 10 is sufficiently held in the pipe 22 to prevent it from slipping upon subsequent movements of the tool S–1 or T therethrough. Thus, the cylindrical portion 116 of the tool S–1 may be sufficiently large to initially expand the liner 10 into a tight contact with the inside surface of the pipe 22 so that the collapsible support 124 may be moved to the position of FIG. 9 and permit the complete passage of the cylindrical portion 116 through the liner 10 prior to inserting the tool T. On the other hand, if the tool S–1 does not expand the liner 10 sufficiently so that it is tightly wedged in the pipe 22, the lowering of the tool S–1 must be discontinued prior to contact with the collapsible support 124, and then the tool S–1 must be removed for the subsequent insertion of the tool T for the stretching or enlargement of the liner 10 for a secure engagement with the inside of the pipe 22. After the upper portion of the liner 10 is secured in the pipe 22, by the expansion with the tool T, the tool T may be able to cause the reverse bend 11 at the lower portion of the liner to straighten out and also to expand same into a tight position within the pipe 22. If the tool T cannot remove the reverse bend at the lower portion of the liner 10, it must be removed and the tool S–1 must be reinserted so that it removes the reverse bend and forms the substantially cylindrical tube. Then the tool S–1 can be removed and the tool T subsequently inserted for the final expansion or enlargement of the lower portion of the liner 10.

Although the invention has been described herein with a single reverse bend, which is the most practical way for the liner 10 to be constructed, the liner 10 may have more than one reverse bend 11, in which case the swaging or expanding tools S and S–1 would have appropriate tapered slots 14 and 114 to correspond with each of such reverse bends.

Also, the tool T may be used for expanding a liner which has no reverse bends but which is initially of an outside diameter that is smaller than the inside diameter of the pipe in which it is to be disposed for patching purposes. The tool T may be manipulated with ordinary link type or other mechanical jar on a wireline instead of an explosive jar such as disclosed in my U.S. Patent No. 3,191,677. In such instances, the swaging tool such as the tools S and S–1 are eliminated and only the expander tool T is used since the reverse bend 11 does not have to be straightened out. The jarring is repeated without removing the jar from the pipe as is required for repeating the explosive jar of said Patent No. 3,191,677. Also, with the mechanical wireline jarring, each downward jar produces a shorter travel than when using an explosive jar so that the fluid resistance due to fluid below the expander tool T does not impede the jarring action with the mechanical jars.

I claim:

1. A method of repairing pipe in a well, comprising the steps of:
    (a) positioning a malleable liner having at least one reverse bend therein at a predetermined elevation in the pipe to be repaired;
    (b) lowering a mechanical jarring tool with a swaging tool therebelow into the pipe on a wireline; and
    (c) imparting repetitive downward jarring blows to said swaging tool by manipulating the wire line supporting the jarring tool to move said swaging tool downwardly in the bore of said liner to effect outward bending of each reverse bend in said liner so as to form said liner into a substantially smooth cylinder within said pipe.

2. The method set forth in claim 1, including:
    (a) enlarging the diameter of the liner by outwardly stretching same following the outward bending of each reverse bend in the liner to thereby tightly wedge the liner in the pipe.

3. The method set forth in claim 1, including:
    (a) outwardly bending each reverse bend for only a portion of the full length of said liner; and
    (b) thereafter enlarging the diameter of the liner by outwardly stretching same using an enlarging tool in the portion in which each reverse bend has been bent outwardly.

4. The method set forth in claim 1, including:
    (a) outwardly bending each reverse bend for only a portion of the full length of said liner;
    (b) thereafter enlarging the diameter of the liner by outwardly stretching same using an enlarging tool in the portion in which each reverse bend has been bent outwardly; and
    (c) jarring both the enlarging tool and the swaging tool downwardly together with the swaging tool preceding the enlarging tool for the remainder of the liner so as to outwardly bend each reverse bend for the full length of the liner and also stretch same to tightly wedge the liner in the pipe.

5. The method set forth in claim 1, including:
    (a) outwardly bending each reverse bend for at least a portion of the length of the liner so as to form a cylinder which has an external diameter which is less than the internal diameter of the pipe to be repaired; and
    (b) thereafter further enlarging the external diameter of the liner so that it is tightly wedged in the pipe.

6. The method set forth in claim 1, including:
    (a) outwardly bending each reverse bend for at least a portion of the length of the liner so as to form a cylinder which is tightly wedged in the pipe to be repaired.

7. The method set forth in claim 1, wherein:
    (a) the liner has only a single reverse bend therein.

8. The method set forth in claim 1, wherein the outward bending of each reverse bend is effected with no appreciable stretching of the metal in the liner during such outward bending.

9. In combination, a malleable liner for a well pipe wherein the liner has at least one reverse bend, and a swaging tool, wherein said swaging tool comprises:
    (a) a solid wedge-shaped body having a smaller lower end and a larger upper end;
    (b) said smaller lower end being of approximately the same size as the opening in the upper end of the liner so as to be initially received therein; and
    (c) said wedge-shaped body having a longitudinally extending slot on one side which conforms generally to the reverse bend at its lower end and which is tapered upwardly so that the depth of said slot is reduced at the upper end thereof.

10. The structure set forth in claim 9, wherein:
    (a) said body has at least one longitudinally extending fluid course for allowing well fluid to flow upwardly therethrough as the swaging tool is moved downwardly in the liner.

11. The structure set forth in claim 9, wherein:
    (a) the upper end of said body is substantially cylindrical so as to expand the liner to a substantially cylindrical shape for at least a major portion of the length of the liner.

12. The structure set forth in claim 9, including:
(a) a longitudinally movable segment near the upper end of said body; and
(b) means mounting said segment for downwardly and inwardly inclined movement to reduce the external size of said body at the elevation of said segment to thereby facilitate removal of the swaging apparatus from the liner.

13. A method of repairing pipe in a well, including the steps of:
(a) supporting a liner in a pipe to be repaired adjacent a defect in the pipe wherein said liner has an outer diameter which is less than the inner diameter of the pipe;
(b) lowering a mechanical jarring tool with a swaging tool therebelow into the pipe on a wireline; and
(c) imparting repetitive downward jarring blows with the mechanical jarring tool to the swaging tool by manipulating the wire line to repeatedly jar the swaging tool downwardly in the bore of the liner to effect outward expanding of the diameter of the liner to tightly wedge same in the pipe while leaving the jar in the pipe for the repetitive jarring action.

14. The method set forth in claim 13, wherein:
(a) said liner is initially inserted into the pipe in a substantially cylindrical shape.

15. The method set forth in claim 13, wherein:
(a) said liner is initially formed with a reverse bend and is subsequently at least partially straightened out to a substantially cylindrical shape prior to the outwardly expanding of the liner.

References Cited

UNITED STATES PATENTS

| | | | |
|---|---|---|---|
| 189,411 | 4/1877 | Wright | 72—479 |
| 1,233,888 | 7/1917 | Leonard | 166—46 |
| 1,301,285 | 4/1919 | Leonard | 166—206 X |
| 1,380,182 | 5/1921 | Bigelow | 166—207 |
| 3,162,245 | 12/1964 | Howard et al. | 166—207 |
| 3,167,122 | 1/1965 | Lang | 166—14 |
| 3,191,677 | 6/1965 | Kinley | 166—14 |
| 3,358,760 | 12/1967 | Blagg | 166—14 |

OTHER REFERENCES

Uren, L. C.: Petroleum Production Engineering, "Development" 4th ed., McGraw-Hill, N.Y., 1956, TN 870 U 7, pp. 530 and 531.

DAVID H. BROWN, Primary Examiner

U.S. Cl. X.R.

166—207